Oct. 22, 1946.　　　T. R. ANDERSON　　　2,409,609
INTERNAL-COMBUSTION ENGINE
Filed June 9, 1944
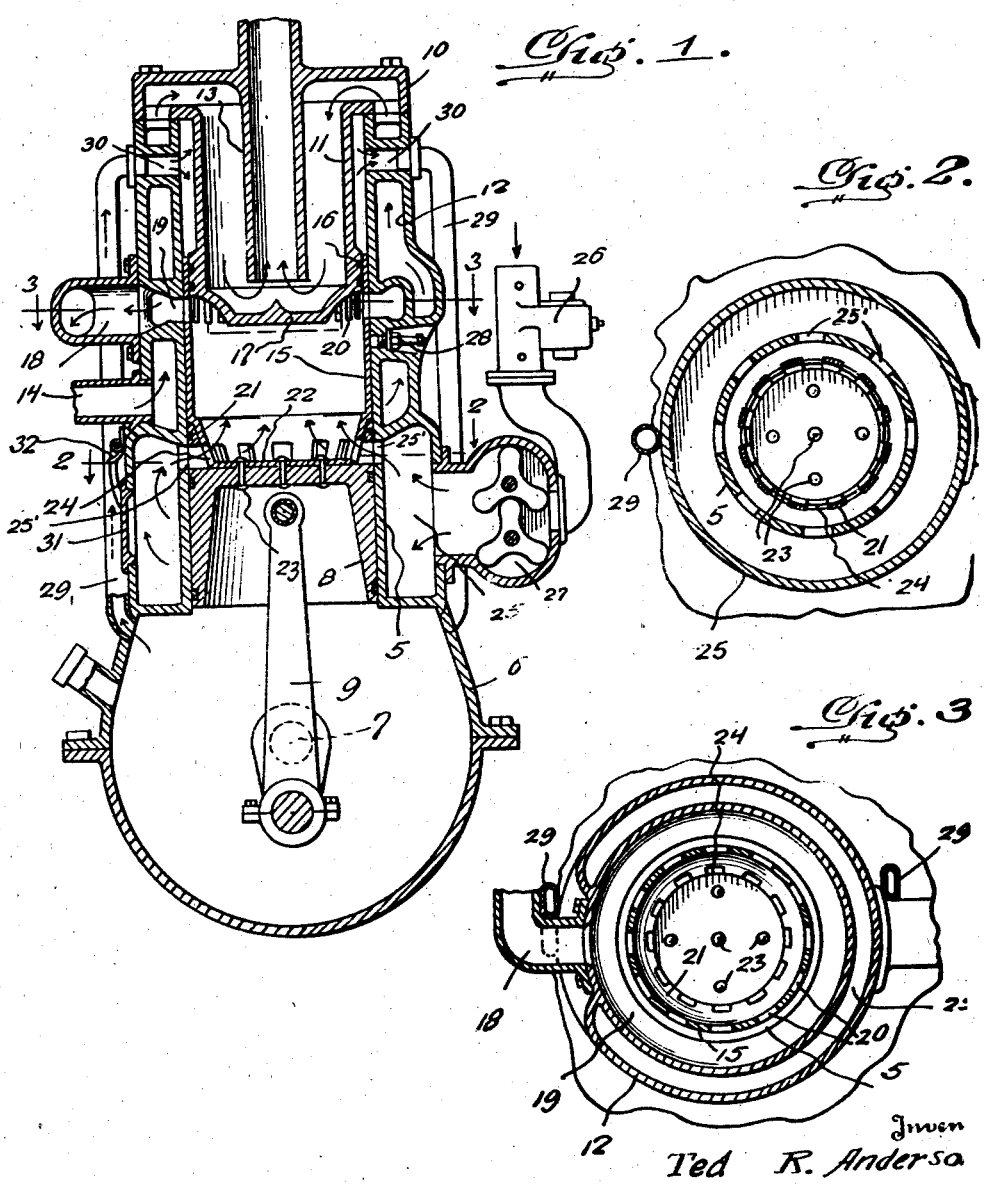
Ted R. Anderson Patented Oct. 22, 1946

2,409,609

UNITED STATES PATENT OFFICE 2,409,609

INTERNAL-COMBUSTION ENGINE

Ted R. Anderson, Puunene, Maui, Territory of Hawaii

Application June 9, 1944, Serial No. 539,438

2 Claims. (Cl. 123—65)

The present invention relates to new and useful improvements in internal combustion engines of the two cycle type, and has for its primary object to provide a sliding sleeve valve mechanism controlling the inlet and exhaust ports for the engine, and in which the valve is connected directly to the piston of the engine.

A further important object of the invention is to provide a novel engine head construction for cooling the sliding sleeve valve as well as the piston and cylinder of the engine.

A still further object is to provide an engine of this character of simple and practical construction, which is efficient and reliable in performance, in which the number of moving parts usually required for the operation of an engine is materially reduced to thus promote economy in the construction of the engine and which otherwise is well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a vertical sectional view through the engine.

Figures 2 and 3 are transverse sectional views taken respectively on the lines 2—2 and 3—3 of Figure 1.

Referring now to the drawing in detail, wherein for the purposes of illustration I have shown a preferred embodiment of the invention, the numeral 5 designates the engine cylinder communicating at its lower end with the crank case 6 in which the crank shaft 7 is operatively mounted and operatively connected with the piston 8 working in the cylinder by means of the connecting rod 9.

The top of the cylinder 5 is closed by the engine head 10 and which includes a cylindrical chamber 11 extending downwardly into the cylinder 5 in spaced relation from the walls thereof.

A water jacket 12 surrounds the upper portion of the cylinder 5 and communicates at its upper portion with the chamber 11 in the head 10. A tube 13 extends through the top of the head 10 downwardly and axially into the chamber 11 and for attaching at its upper end to the engine radiator (not shown), while the lower portion of the water jacket 12 has a lateral water pipe 14 attached thereto and which is also connected to the radiator to complete the water circulation cooling system.

A sleeve 15 has a snug working fit in the middle upper portion of the cylinder 5 between the walls of the chamber 11 and the walls of the cylinder, the external walls of the chamber 11 adjacent its bottom portion having piston rings 16 fitted therein cooperating with the internal walls of the sleeve 15 to prevent the escape of gases upwardly around the walls of the chamber 11.

The walls of the chamber 11 below the piston rings 16 converge to form a bottom 17 of reduced diameter for the chamber and which extends below the lateral exhaust manifold 18 which has communication with the cylinder through the annular chamber 19.

The portion of the cylinder 5 below the bottom 17 of the chamber 11 and above the piston 8 forms a combustion chamber and the sleeve 15 has an annular series of vertical slots 20 in its wall just below the margin of the bottom 17 and at circumferentially spaced intervals to register with the annular chamber 19 and through the latter communicate intermittently with the exhaust manifold 18 during reciprocating movement of the sleeve 15.

The walls of the sleeve 15 adjacent its bottom portion taper, as shown at 21, to provide a bottom 22 for the sleeve of reduced diameter and which is secured to the top of the piston 8 by means of bolts or the like 23. The tapered walls 21 of the sleeve are formed with openings 24 at circumferentially spaced intervals and which are in communication with an intake manifold 25 surrounding the lower portion of the cylinder 5 by way of ports 25'.

Fuel from the carburetor 26 is forced into the intake manifold 25 by means of a gear-type pump 27.

A spark plug 28, or other conventional form of ignition device, is mounted in the wall of the cylinder 5 for exploding the combustible charge entering the sleeve through the ports 24 when the tapered lower portion 21 of the sleeve is moved upwardly during the compression stroke of the piston to a point where the spark plug 28 is uncovered by said tapered wall.

A pair of pipes 29 connect the upper portion of the crank case 6 with the upper portion of the space between the cylinder 5 and the chamber 11 by way of passages 30 to admit oil laden fumes from the crank case to the upper portion of the cylinder to lubricate the sleeve 15.

A pivoted relief valve 31 is positioned in the intake manifold 25 and normally held in closed position by a spring 32, the relief valve being adapted to be opened should back firing occur in the cylinder.

In the operation of the engine, and with the piston 8 at the end of its power stroke, as shown in Figure 1, fuel is forced into the combustion chamber through the ports 24 and also forces the burnt gases out through the ports 20 and exhaust manifold 18, thus scavenging the chamber.

At the beginning of the compression or up-stroke of the piston the intake ports of the intake manifold 25 are first closed by the piston and the ports 20 are also moved upwardly to close the exhaust ports, whereupon the continued upward movement of the piston will compress the charge. When the tapered lower end of the piston reaches close to the spark plug 28, the charge is ignited and on the power stroke the exhaust ports are first uncovered to exhaust the burnt gases before further fuel is admitted.

It is believed that the details of construction and the manner of operation and advantages of the device will be readily understood from the foregoing without further detailed explanation.

Having thus described the invention, what I claim is:

1. An internal combustion engine comprising a cylinder, a head closing the top of the cylinder, a chamber carried by the head and projecting downwardly into the top of the cylinder in spaced relation from the walls thereof, a tube adapted for connection to a water circulating system and extending downwardly through the head to a point adjacent the bottom of the chamber, a water jacket surrounding the upper portion of the cylinder and communicating with the chamber, a piston working in the lower portion of the cylinder, said cylinder having inlet and exhaust ports, and a sleeve working between the walls of the cylinder and chamber and connected to the piston for movement therewith, said sleeve having inlet and exhaust openings adapted to register with the inlet and discharge ports respectively of the cylinder during predetermined movements of the piston.

2. An internal combustion engine comprising a cylinder, a piston working therein, said cylinder being closed at its upper end by a head and having an intake port in its lower portion and an exhaust port in its upper portion, a sleeve slidably mounted in the cylinder and connected to the piston to reciprocate therewith, said sleeve having inlet and exhaust ports respectively in its lower and upper portions and adapted to register respectively with the inlet and exhaust ports of the cylinder during predetermined periods of reciprocatory movement of the piston to control admission of fuel to the cylinder and discharge of products of combustion therefrom, and a cylindrical air chamber carried by the head of the engine cylinder and extending downwardly in said engine cylinder in annularly spaced relation thereto and having a leak-tight sliding fit at its inner end in the upper portion of said sleeve, said air chamber terminating at its inner end short of the exhaust port of said sleeve.

TED R. ANDERSON.